United States Patent [19]

Yamaguchi

[11] 4,144,612

[45] Mar. 20, 1979

[54] CLEANSING AND WIPING CLOTH

[76] Inventor: Miwako Yamaguchi, 48-5, Honcho 4-Chome, Nakano-ku, Tokyo, Japan

[21] Appl. No.: 914,095

[22] Filed: Jun. 9, 1978

[51] Int. Cl.$^2$ .......................... A47L 13/16; B32B 7/08
[52] U.S. Cl. ...................................... 15/208; 112/441; 428/102
[58] Field of Search ...................... 15/104.93, 118, 208, 15/209 R, 209 B, 210 R, 223, 244 B, 244 C; 112/420, 439, 440, 441; 428/102, 104, 255

[56] References Cited

U.S. PATENT DOCUMENTS

| 2,233,746 | 3/1941 | Potter | 15/209 R |
|---|---|---|---|
| 2,546,102 | 3/1951 | LeRette | 15/230.15 |
| 3,761,991 | 10/1973 | Moss | 15/209 B |
| 3,908,218 | 9/1975 | Oishi | 15/209 B |

FOREIGN PATENT DOCUMENTS

| 360066 | 11/1931 | United Kingdom | 15/209 R |
|---|---|---|---|
| 847304 | 9/1960 | United Kingdom | 15/209 R |

Primary Examiner—Daniel Blum
Attorney, Agent, or Firm—Lawrence I. Field

[57] ABSTRACT

A cloth for cleansing and wiping composed of a plurality of layers of fabrics being substantially of the same size. Each fabric is woven from yarns of spun rayon. Interstices between individual warp yarns and filling yarns are from 0.5 mm to 2.0 mm. The common borders of said layered fabrics and the portions surrounded by said common borders are stitched.

8 Claims, 5 Drawing Figures

CLEANSING AND WIPING CLOTH

BACKGROUND OF THE INVENTION

The present invention relates generally to a cloth for cleansing and wiping, and in particular to a cloth which is excellent in moisture-absorbing capacity, which can be easily dried and which permits contaminating substances to be less remained.

Generally, a conventional cloth for cleansing and wiping purposes is woven from cotton or linen fibers, or cotton, linen and synthetic fibers. In regard to the moisture absorption, the conventional cloth chiefly depends upon the susceptibility of the component fibers to absorb moisture within themselves. Therefore, the moisture absorbing capacity of the cloth is determined by the nature of the employed raw material fibers, and so the property is not so superior. It is therefore necessary and inevitable to perform the wiping action troublesomely for absorbing a large amount of liquid. As is known, the capillary attraction also helps this moisture absorbing action. However, with the conventional cloth, as it is interwoven with dense interstices between the component yarns, such a physical phenomenon is not effectively utilized, but a film of the liquid is rather formed on the cloth surfaces when the liquid is being wiped, thereby to interrupt the moisture absorbing action thereof.

In regard to the drying property, on the other hand, when the cotton yarn is used, for example, the liquid is absorbed into the core of the cotton fiber. The cloth therefore tends to lose the property to give off a moisture through evaporation as it is used repetitively, and this results in requiring a long time for drying the cloth. Besides, since the interstices between the individual cotton yarns are relatively dense, the cloth exhibits poor permeability, causing the drying speed to be further delayed.

Moreover, in regard to the contaminating substances being remained after washing the cloth, impurities such as solid particles and pigments contained in the liquid tend to infiltrate into the core of the fibers together with the absorbed liquid and the residing amount of the impurities tends to increase with the repeated use of the cloth even if it is washed or bleached, thereby to make the cloth very undesirable for the health.

Particularly, when the cotton cloth is used as a dishcloth, bacteria tends to, as is known, adhere or agglomerate on the porous natural fibers having developed fibrous structure, whereby the agglomerated bacteria propagate in the pores making the cloth very inconvenient together with the aforementioned defects.

It has therefore been strongly desired to provide a cloth for cleansing and wiping, which is free of the aforementioned defects, which exhibits excellent moisture absorbing capacity, which dries easily, and which permits less contaminating substances to be remained.

SUMMARY OF THE INVENTION

According to the present invention, there is provided an improved cloth for cleansing and wiping having excellent moisture absorbing capacity, easy-to-dry property and which permits less contaminating substances to be remained.

The improved cloth in accordance with the present invention is composed of a plurality of layers of fabrics of a predetermined size, each of the fabric layers being substantially of the same size and fastened together around their common borders. The portions surrounded by said common borders are further stitched to provide the cloth with strength and durability. Each of the fabrics is interwoven with warp yarns and filling yarns, and the interstices among the warp yarns and the filling yarns are selected to be from 0.5 mm to 2.0 mm. The warp yarns and the filling yarns are all made of spun yarns composed of staple fibers of viscose rayon.

The improved cloth according to the present invention consists of at least 5 layers of fabrics, preferably 7 to 9 layers, and is stitched together by stitching at a predetermined spacing, preferably a spacing of 4.0 cm to 6.0 cm, in order to impart the strength and durability to the cloth.

Accordingly, the object of the present invention is to provide a cloth for cleansing and wiping having excellent moisture absorbing capacity, effectively utilizing the capillary attraction which is caused by open spaces formed among the individual yarns and between the layers of fabrics as well as the hydrophillic property of the rayon yarns, without depending upon the susceptibility of the component fibers to absorb moisture within themselves.

Another object of the present invention is to provide a cloth for cleansing and wiping which dries very easily using a fabric composed of yarns of spun rayon, the fabric having sufficient interstices among the individual yarns.

A further object of the present invention is to provide a cloth for cleansing and wiping using yarns of 100% spun rayon, which can be easily washed with water without leaving the residual contaminating substances.

A still further object of the present invention is to provide a cloth for cleansing and wiping, which inhibits the adhesion or agglomeration and propagation of bacteria and which remarkably reduces the contamination caused by bacteria.

Yet another object of the present invention is to provide a cloth for cleansing and wiping having excellent strength and durability.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
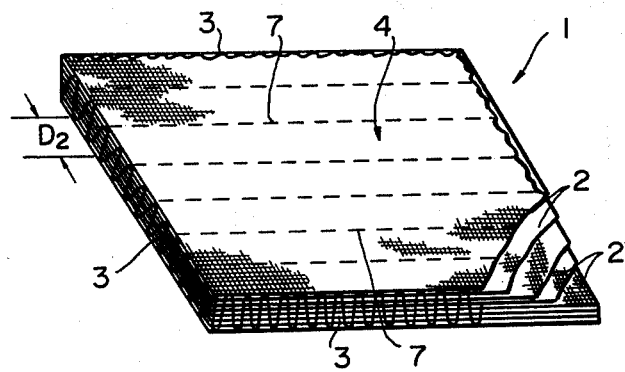
FIG. 1 is a partly cut-away perspective view showing an embodiment of a cloth for cleansing and wiping according to the present invention.

Referring first to FIG. 1, a cloth for cleansing and wiping according to the present invention, generally indicated by the reference numeral 1, consists of layers of 8 pieces of fabrics 2 cut into square having a size of 30 cm wide and of 30 cm long. Common borders 3 of each fabric 2 are so connected together that the layers of said 8 pieces of fabrics 2 will be formed integrally. The connecting can be effected by a known manner such as hemming, heat welding or the like.

Figure 2:
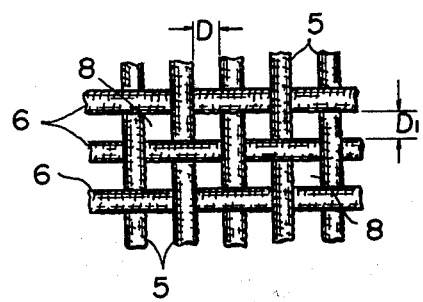
FIG. 2 is a fragmental plan or face view showing one simple form of woven fabric used for the cloth according to the present invention.

Each fabric 2 forming the layers is made from a single set of warp yarns 5 interwoven with a single set of filling yarns 6, as shown in FIG. 2. Interstices $D$ and $D_1$ between the neighbouring yarns are selected to be from 0.5 mm to 2.0 mm, preferably from 0.8 mm to 1.4 mm, whereby relatively large open spaces 8 are formed by the yarns 5 and 6. Said warp yarns 5 and filling yarns 6 are composed of 100% spun rayon made from staple fibers of viscose rayon. Yarns 5 and 6 have relatively large thickness, usually from count No. 30 to count No. 10. In the present invention, however, the thickness needs not necessarily be limited thereto, but suitable sizes should be selected depending upon the use of the cloth. Here, however, it is essential that the interstices $D$ and $D_1$ among the individual yarns are within the aforementioned range, whichever thickness of the yarns 5 and 6 are selected.

Referring again to FIG. 1, the thus formed fabrics 2 are stacked in layers as mentioned in the foregoing. The portions 4 of the fabrics 2 surrounded by said common borders 3 are secured together by a plurality of rows of stitching 7 penetrating through the whole layers and extending through the whole layers. The distance $D_2$ between each row of stitching 7 is selected to range from 4.0 cm to 6.0 cm. Since the yarns of spun rayon used in the present invention have poor tensile strength, the stitching 7 is provided in order to increase the durability and strength of the cloth 1.

Although 8 layers of fabric 2 are shown in the aforementioned embodiment, it has been learned through laborious study and experiments that the cloth for cleansing and wiping according to the present invention should have at least 5 layers, preferably 7 to 9 layers from the viewpoints of strength, moisture absorbing capacity, drying speed, and prevention of the remaining of contaminating substances.

Figure 3:
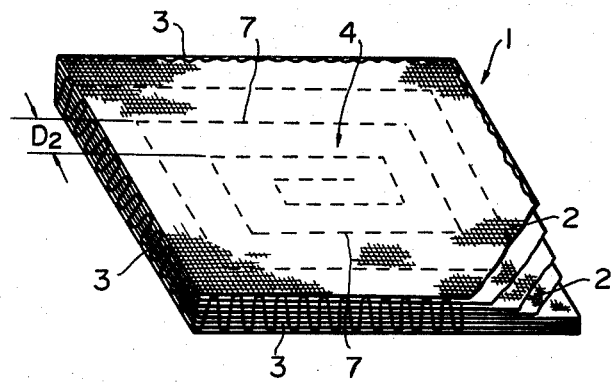
FIG. 3 is a partly cut-away perspective view showing another embodiment of the cloth for cleansing and wiping according to the present invention.

Further, instead of a plurality of rows illustrated with reference to the foregoing embodiment, the stitching 7 may also be provided in a spiral form maintaining a predetermined distance $D_2$, preferably a distance over a range of 4.0 cm to 6.0 cm, as shown in FIG. 3. With the stitching 7 being provided in a spiral form, it was found that the product cloth is provided with remarkably increased strength irrespective of the direction thereof and exhibits strikingly increased durability.

Figure 4:
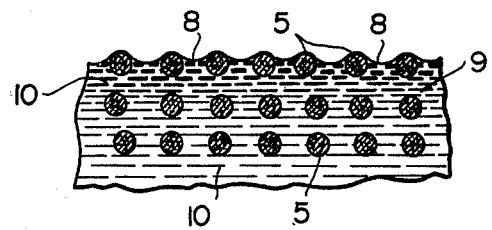
FIG. 4 is a cross-sectional view showing on an enlarged scale a portion of the cloth of FIG. 1 in which is absorbed a liquid.

A liquid 10 containing impurities scraped from objects to be cleansed or wiped is absorbed by the capillary attraction into said open spaces 8 formed by the yarns 5, 6 and open spaces 9 formed between the layers of the fabrics 2 without depending upon the susceptibility of the component yarns to absorb moisture within themselves, and is further absorbed into fabrics 2 of the inner layers, as shown in FIG. 4. That is, since the present invention employs yarns 5, 6 of 100% rayon composed of staple fibers of viscose rayon, the absorbed liquid and the impurities contained therein do not infiltrate into the core of the staple fibers, but are held by capillary attraction in the open spaces 8, 9 of the cloth 1.

The inventor has conducted experiments using cloths composed of yarns 5, 6 of cotton, linen, cupra-ammonium type rayon, and viscose rayon, and has observed that the moisture absorbing capacity hardly changes depending upon the cloths made of the aforementioned different materials, but found a surprising difference in regard to the remaining of impurities after these cloths were washed, i.e., the difference in regard to separating the solid particles, pigments and oil components contained in the wiped liquid. That is, it was found that when the cloth made of the yarns of viscose rayon was used, the impurities were easily separated and removed away simply by washing it with water; the cloth was washed clean and could be used repetitively maintaining sanitary condition. When the cloths made of yarns of cupra-ammonium type rayon, cotton and linen were used, on the other hand, the impurities remained in these cloths even if they were washed with water, and the impurities were hardly separated from the cloths despite of the use of detergent. This is attributed to the fact that the viscose rayon allows very small amounts of the impurities to infiltrate into the core of the fibers, since the staple fiber of the viscose rayon has a smooth surface and is not a porous fiber.

Figure 5:
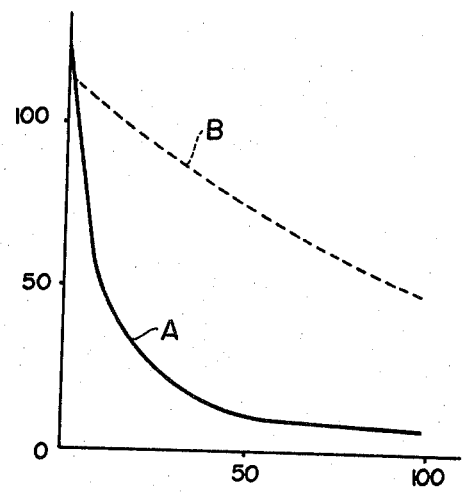
FIG. 5 is a graph comparing the drying speed of the cloth according to the present invention with that of a cloth using cotton yarns.

The inventor has further conducted experiments to dry in the open air the cloths made of different component fibers but having the same construction, i.e., to dry the cloth made of cotton and the cloth according to the present invention which are soaked with water, and obtained the results shown in FIG. 5. In the FIG. 5, the ordinate represents moisture content and the abscissa represents the lapse of time. A curve A represents the change in moisture content of the cloth according to the present invention, and a curve B represents the change in moisture content of the cloth made of cotton. Numerical values read from the FIG. 5 are shown in Table below.

Table 1

| Moisture content (%) | Lapse of time (min.) | | | | |
|---|---|---|---|---|---|
| | 10 | 25 | 50 | 75 | 100 |
| (A) Moisture content of the cloth according to the present invention | 60 | 30 | 12 | 10 | 9 |
| (B) Moisture content of the cloth made of cotton | 100 | 90 | 75 | 60 | 50 |

From Table 1 above, it will be easily understood that the cloth according to the present invention has a capacity to give off the moisture through evaporation more quickly than the conventional cloth made of cotton. This is attributed to the fact that the cotton fiber which is a natural fiber has a porous structure thereon, whereas the cloth according to the present invention is made of yarns of viscose rayon, and each staple fiber of the yarns has a smooth surface thereon, rendering the fiber to exhibit very small moisture absorbing capacity.

Accordingly, it will also be understood that the cloth in accordance with the present invention has a property of drying speedily and hold the good sanitary conditions for a long period.

As mentioned above, the cloth for cleansing and wiping in accordance with the present invention is composed of a plurality of layers of fabrics, and each fabric is woven from yarns of staple fibers of viscose rayon having sufficient interstices between the yarns. The cloth therefore exhibits excellent moisture absorbing capacity owing to the hydrophilic property of the spun rayon yarns and capillary attraction of the formed interstices. While the yarns themselves exhibit very small moisture absorbing property, the liquid and the impurities contained therein are held only in the interstices among yarns of the fabric and between the layers of fabrics, and do not infiltrate into the cores of the staple fibers. Consequently, the impurities such as oily components, solid particles and pigments do not remain within the cloth, but can be separated and given off by the washing and bleaching thereto, making it possible to maintain favourable sanitary conditions for extended periods of time and further enabling the cloth itself to be used until it is worn out.

Furthermore, the yarns of said rayon have smooth surfaces owing to their fibrous structure, and excellent property of giving off water. Therefore, the cloth according to the present invention made of such yarns permits less bacteria to adhere and is dried quickly as compared to the conventional cloths made by weaving cotton, linen, or cotton, linen and synthetic fibers. Eventually, the cloth according to the present invention is very desirable from the standpoint of sanitation without permitting bacteria to propagate.

The cloth according to the present invention can be widely used such as wiping contaminated water on a table, cleaning the floor, and removing cosmetics.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved cloth for cleansing and wiping comprising:
   a plurality of stacked, individual layers of fabrics consisting of viscose rayon;
   all of said layers of fabrics being substantially of the same size and secured together around common borders thereof, all of said layers of fabrics being stitched together in the area surrounded by said common borders for imparting strength and durability to said cloth, each fabric of said layers being made from a single set of warp yarns interwoven with a single set of filling yarns, interstices between adjacent warp yarns and between adjacent filling yarns being in a range of from 0.5 mm to 2.0 mm, and all of said yarns being entirely of spun rayon.

2. An improved cloth as set forth in claim 1, wherein said yarns are made of staple fibers of viscose rayon.

3. An improved cloth as set forth in claim 1, wherein said fabric is stacked into 7 to 9 layers.

4. An improved cloth as set forth in claim 1, wherein said plurality of layers of fabrics are stitched together in a plurality of rows spaced apart equidistantly.

5. An improved cloth as set forth in claim 1, wherein said plurality of layers of fabrics are stitched together in a spiral manner.

6. An improved cloth as set forth in claim 2, wherein said interstices between said adjacent warp yarns and between said adjacent filling yarns are in a range of from 0.8 mm to 1.4 mm.

7. An improved cloth as set forth in claim 4, wherein the distance between said stitches in a plurality of rows is in range from 4.0 cm to 6.0 cm.

8. An improved cloth as set forth in claim 5, wherein the distance between said stitches in a spiral is in a range from 4.0 cm to 6.0 cm.

* * * * *